United States Patent
Falk

(10) Patent No.: US 12,498,003 B2
(45) Date of Patent: Dec. 16, 2025

(54) ACTUATING ELEMENT FOR A CLUTCH, WITH AT LEAST ONE SPRING ELEMENT, AND CLUTCH

(71) Applicant: Schaeffler Technologies AG & Co. KG, Herzogenaurach (DE)

(72) Inventor: Manuel Falk, Baden Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/854,611

(22) PCT Filed: Feb. 14, 2023

(86) PCT No.: PCT/DE2023/100120
§ 371 (c)(1),
(2) Date: Oct. 7, 2024

(87) PCT Pub. No.: WO2023/198237
PCT Pub. Date: Oct. 19, 2023

(65) Prior Publication Data
US 2025/0230844 A1    Jul. 17, 2025

(30) Foreign Application Priority Data
Apr. 12, 2022 (DE) .................. 10 2022 108 834.0

(51) Int. Cl.
*F16D 25/08*    (2006.01)
*F16D 25/061*   (2006.01)

(52) U.S. Cl.
CPC ......... *F16D 25/083* (2013.01); *F16D 25/061* (2013.01)

(58) Field of Classification Search
CPC ...... F16D 11/10; F16D 25/083; F16D 25/061; F16D 25/063; F16D 25/06
See application file for complete search history.

(56) References Cited

U.S. PATENT DOCUMENTS 12,379,003 B2 *  8/2025  Lichtenwald ......... F16D 25/083
2004/0204282 A1  10/2004 Green

FOREIGN PATENT DOCUMENTS

| DE | 2949194 A1 | 6/1980 |
|----|------------|--------|
| WO | 2018137896 A1 | 8/2018 |
| WO | 2023110004 A1 | 6/2023 |

* cited by examiner

Primary Examiner — Timothy Hannon

(57) ABSTRACT

An actuating element for a clutch includes an annular piston, a plurality of finger elements arranged for displacing a sliding sleeve, and an annular spring element arranged to couple the plurality of finger elements to the annular piston. The annular spring element may have a circumference and a plurality of recesses arranged along the circumference. Each of the plurality of finger elements may be arranged perpendicular to the annular spring element in an assembled state of the actuating element. Each of the plurality of finger elements may have a groove arranged for receiving a peripheral projection of the sliding sleeve in a form-fitting manner.

17 Claims, 1 Drawing Sheet

ACTUATING ELEMENT FOR A CLUTCH, WITH AT LEAST ONE SPRING ELEMENT, AND CLUTCH

CROSS-REFERENCE TO RELATED APPLICATIONS

This application is the United States National Phase of PCT Appln. No. PCT/DE2023/100120 filed Feb. 14, 2023, which claims priority to German Application No. DE102022108834.0 filed Apr. 12, 2022, the entire disclosures of which are incorporated by reference herein.

TECHNICAL FIELD

The present disclosure relates to an actuating element for a clutch for coupling and uncoupling an engine to/from a motor vehicle drive train, having an annular piston and a multiplicity of finger elements which are prepared for making contacting with or moving a sliding sleeve, and a clutch for coupling and uncoupling an engine from a motor vehicle drive train with such an actuating element.

BACKGROUND

Uncoupling devices with actuating elements for separating an engine from a (motor vehicle) drive train are common in the prior art. The coupling or uncoupling takes place, for example, via a movable sliding sleeve, which is axially displaced via the actuating element and is thereby brought into force-transmitting contact with an (intermediate) shaft or is released from this force-transmitting contact. Conventionally, the actuating element is composed of an actuating bell and an axially displaceable (annular) piston or is completely constructed as a single piece. In this regard, these actuating elements or their separate components are made of a flexible material, for example, to ensure lower component stress and improved acoustic properties during operation. Furthermore, bending beams are also used as separate spring elements in these actuating elements in order to achieve a cushioning/springing effect in the axial direction. In particular, however, these solutions still have weaknesses with regard to the adjustability or fine-tuning of these desired cushioning/damping properties for the actuating elements, since the actuating element must be configured to be sufficiently dampening to reduce unwanted vibrations without neglecting or dispensing with the mechanical material stiffness required for the operation of the clutch.

SUMMARY

The present disclosure provides an actuating element for a clutch in which the cushioning properties are improved on the one hand and easily adjustable on the other.

The actuating element has at least one annular spring element arranged between the finger elements and the annular piston, which is provided and configured to couple the finger elements to the annular piston.

The invention present disclosure relates to an actuating element/clutch element for a clutch/disconnect unit (DCU), e.g., for electric axles, for coupling and uncoupling a motor to/from a motor vehicle drive train, with an annular piston and a multiplicity of finger elements/locking (latching) elements which are prepared for making contacting with or moving a sliding sleeve. The actuating element has at least one annular spring element/spring disk arranged between the finger elements and the annular piston, which is provided and configured to couple/connect the finger elements to the annular piston. This ensures more efficient damping properties to reduce unwanted oscillations/vibrations within the clutch.

In other words, the actuating element according to the disclosure for a clutch has an annular piston for applying pressure on both sides/alternately within the clutch as well as several finger elements which are configured in such a way that a sliding sleeve can be connected to them in a form-fitting manner. The sliding sleeve can be moved along the longitudinal axis or axis of rotation of an (intermediate) shaft between a first position in which it is in contact with a clutch body firmly connected to the shaft and a second position uncoupled from the clutch body, whereby the engine can be coupled or uncoupled to/from a motor vehicle drive train. The annular piston and the multiplicity of finger elements are configured as separate components which are coupled to one another via at least one annular spring element, e.g., in the form of a flat plate/sheet metal component, or made of a thin sheet metal material.

By means of the additional thin spring element, a desired defined flexibility of the actuating element can be achieved. This in turn ensures increased/better damping properties within the actuating element or clutch. Furthermore, a spring element, which is configured, for example, as a flat plate, can be manufactured/punched easily and inexpensively and also requires little (axial) installation space. Furthermore, this allows for a high degree of design freedom.

In a further aspect, the at least one spring element has a multiplicity of, e.g., slot-shaped, recesses/cut-outs which are arranged along at least one circumference. These recesses may be formed in sections and run along several circumferences of different sizes of the at least one spring element. This reduces the stiffness of the at least one spring element, which leads to improved damping properties and the reduction of unwanted vibrations in the clutch.

In a further aspect, the multiplicity of finger elements are arranged to be perpendicular to the at least one spring element in the assembled state of the actuating element.

In a further aspect, the multiplicity of finger elements each has a groove into which a peripheral projection of the sliding sleeve engages in a form-fitting manner. In other words, a circumferential projection is formed on the sliding sleeve, which is surrounded by a groove of the multiplicity of finger elements or which hooks/latches into them. This connection may be made as a snap lock.

In a further aspect, the annular piston and/or the multiplicity of finger elements are made of plastic.

According to a further embodiment, the annular piston and the multiplicity of finger elements are integrally connected to the at least one spring element. The annular piston and the multiplicity of finger elements (each made of plastic) may be injection-molded onto the at least one spring element and are thereby integrally connected/fastened thereto. This manufacturing process is simple, cost-effective and also offers a high degree of design freedom during production.

In a further aspect, the multiplicity of finger elements are arranged at a uniform distance from one another along the circumference of the at least one spring element. This ensures that the contact/connection between the finger elements and the sliding sleeve is evenly distributed around the circumference of an (intermediate) shaft or at least one spring element. This ensures sufficient force transmission between the components and thus facilitates axial displacement.

According to a further embodiment, a spring element package consisting of several stacked spring elements, e.g., formed as flat plates, is arranged between the finger elements and the annular piston, whereby the finger elements and the annular piston are or can be coupled to one another.

In other words, the actuating element in this embodiment has a multiplicity of spring elements which are stacked on top of one another and may be fixed to one another in a rotationally fixed manner, whereby a spring element package is formed. The multiplicity of finger elements are firmly connected to one (surface) side of the spring element, while the annular piston is connected to the second (surface) side of the spring element package. On the one hand, this further increases the damping properties of the actuating element, thereby reducing unwanted vibrations. Furthermore, the desired stiffness of the actuating element can be easily adjusted or set via the number of spring elements to be stacked. In addition, this stacked design ensures increased design freedom and improved manufacturability of the spring washers, since design restrictions that arise during the manufacturing or punching process are avoided by stacking the spring elements on top of each other. Essentially, the design restriction/requirement when using a single spring element, that the width of any recesses formed on the spring elements must be greater than the (sheet metal) thickness of the spring elements, is eliminated by stacking several thin (sheet metal) spring elements.

The disclosure further relates to a clutch for coupling and uncoupling an engine to/from a motor vehicle drive train with the actuating element according to the disclosure.

BRIEF DESCRIPTION OF THE DRAWINGS

Both the disclosure and the technical field are explained in more detail below with reference to the figures. It should be noted that the disclosure is not intended to be limited by the exemplary embodiments shown. In particular, unless explicitly stated otherwise, it is also possible to extract sub-aspects of the subject matter explained in the figures and to combine them with other components and knowledge from the present description and/or figures. In particular, it should be noted that the figures and in particular the proportions shown are only schematic in nature. The same features are referenced with the same reference symbols. It is also pointed out that the features of the individual embodiments can be interchanged and can occur in a certain combination.

The present disclosure and one of the example embodiments are described below with reference to the figures. In the drawings.

DETAILED DESCRIPTION

The figures are only schematic in nature and serve only for understanding of the invention. Identical elements are provided with the same reference symbols.

Figure 1:
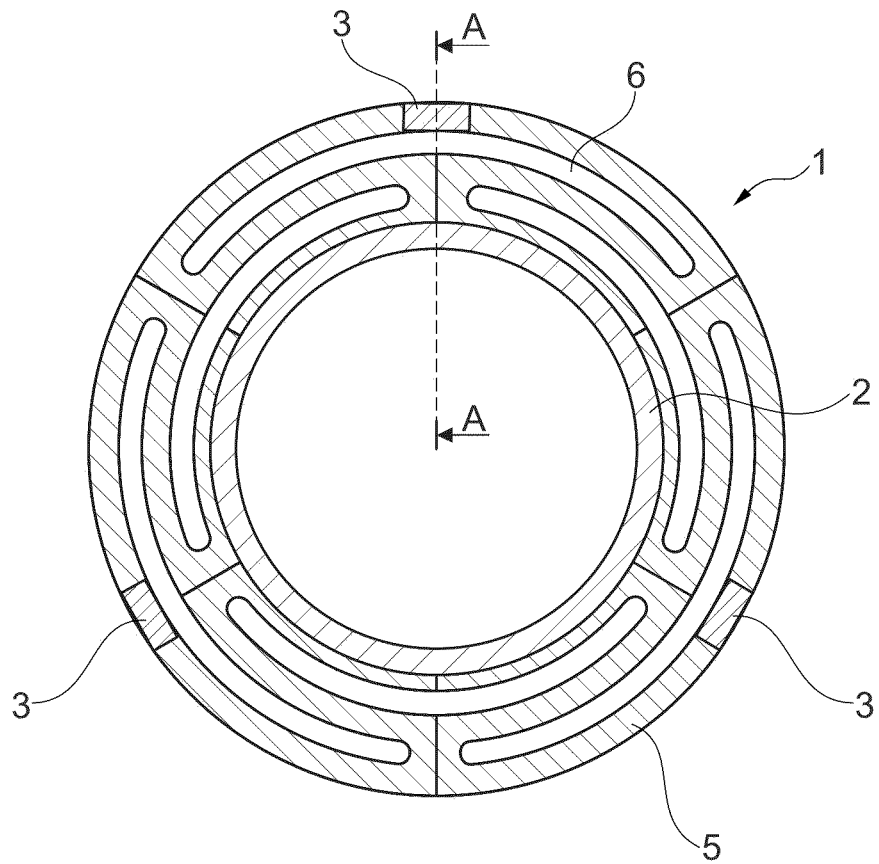
FIG. 1 shows a perspective front view of an actuating element of a clutch according to an example embodiment.

FIG. 1 shows a front view of an actuating element 1 of a clutch according to an example embodiment. In this view, an imaginary axis of the (intermediate) shaft (not shown), on which the actuating element 1 is arranged, extends out of the image plane. The actuating element 1 has a hollow cylindrical annular piston 2, which is connected to an annular spring element/spring ring 5. Here, several spring elements 5 can be stacked on top of each other or, in this view, arranged one behind the other. The spring element 5 and the annular piston 2 are arranged on the same axis and the spring element 5 has a larger outer circumference than the annular piston 2. At the same time, the internal dimensions of both components are the same. Three finger elements 3 are arranged along the outer circumference of the spring element 5, evenly spaced from one another, which are hidden by the spring element 5 in this view but are nevertheless indicated. In this perspective, the three finger elements 3 have the same rectangular cross-section. Furthermore, curved, slot-shaped recesses 6 are arranged on the spring element 5, which may be punched into or through the spring element. Three of the recesses 6 are arranged along a first larger circumference on the spring element 5 and three further uniform recesses 6 are arranged along a second smaller circumference on the spring element. The recesses 6 located on the second smaller circumference are offset from the outer recesses 6.

Figure 2:
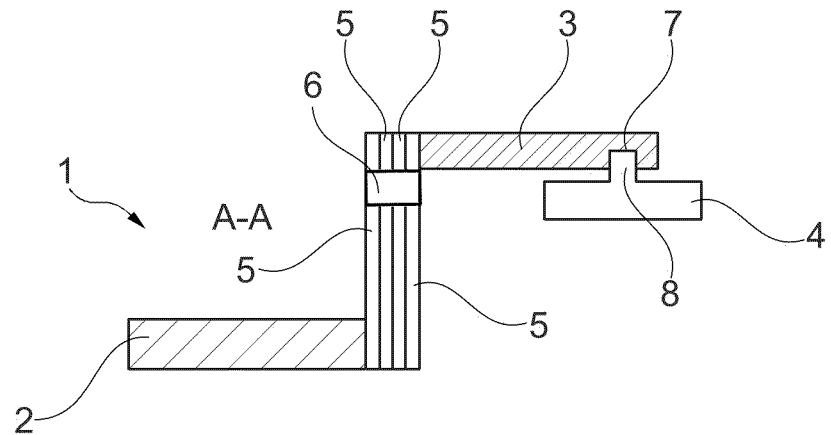
FIG. 2 shows a longitudinally sectioned perspective side view through the section plane A-A of the actuating element shown in FIG. 1.

FIG. 2 shows a longitudinally sectioned perspective side view through a section plane A-A, which runs through the half above a central axis of the actuating element 1 shown in FIG. 1. In addition, a rotation axis of the actuating element 1 is shown as a dash-dot line. Four spring elements 5 can be seen, which are stacked on top of each other and form a spring element package. The annular spring elements 5 are arranged such that a diameter line of the spring elements 5 runs perpendicular to the axis of rotation of the actuating element 1 or the (intermediate) shaft (not shown). The recesses 6 of the four spring elements 5 are also arranged one above the other. The annular piston 2 is arranged on one outer side of the spring element package (here on the left), whereas on the second outer side of the spring element package (here on the right) a finger element 3 is arranged to be perpendicular to the outer spring element 5. At the right end section of the finder element, a groove 7 is formed into which a circumferential projection 8 of a sliding sleeve 4 engages or snaps into place in a form-fitting manner.

REFERENCE NUMERALS

1 Actuating element
2 Annular piston
3 Finger element
4 Sliding sleeve
5 Spring element
6 Recess
7 Groove
8 Projection

The invention claimed is:

1. An actuating element for a clutch for coupling and uncoupling an engine to/from a motor vehicle drive train, having an annular piston and a multiplicity of finger elements, which are prepared for making contacting with or moving a sliding sleeve, wherein the actuating element has at least one annular spring element which is arranged between the finger elements and the annular piston and is provided and configured to couple the finger elements to the annular piston.

2. The actuating element according to claim 1, wherein the at least one spring element has a multiplicity of recesses which are arranged along at least one circumference.

3. The actuating element according to claim 1, wherein the multiplicity of finger elements are arranged to be perpendicular to the at least one spring element in the assembled state of the actuating element.

4. The actuating element according to claim 1, wherein the multiplicity of finger elements each has a groove into which a peripheral projection of the sliding sleeve engages in a form-fitting manner.

5. The actuating element according to claim 1, wherein the annular piston or the multiplicity of finger elements are made of plastic.

6. The actuating element according to claim 5, wherein the annular piston and the multiplicity of finger elements are integrally connected to the at least one spring element.

7. The actuating element according to claim 1, wherein the multiplicity of finger elements are arranged at a uniform distance from one another along a circumference of the at least one spring element.

8. The actuating element according to claim 1, wherein a spring element package consisting of a plurality of stacked spring elements is arranged between the finger elements and the annular piston and couples these together.

9. A clutch for coupling and uncoupling an engine to/from a motor vehicle drive train with an actuating element according to claim 1.

10. An actuating element for a clutch, comprising:
an annular piston;
a plurality of finger elements arranged for displacing a sliding sleeve; and
an annular spring element arranged to couple the plurality of finger elements to the annular piston.

11. The actuating element of claim 10, wherein the annular spring element comprises:
a circumference; and
a plurality of recesses arranged along the circumference.

12. The actuating element of claim 10, wherein each of the plurality of finger elements is arranged perpendicular to the annular spring element in an assembled state of the actuating element.

13. The actuating element of claim 10, wherein each of the plurality of finger elements comprises a groove arranged for receiving a peripheral projection of the sliding sleeve in a form-fitting manner.

14. The actuating element of claim 10, wherein:
the annular piston is made of plastic; or
each of the plurality of finger elements is made of plastic.

15. The actuating element of claim 10, wherein the annular piston and the plurality of finger elements are integrally connected to the annular spring element.

16. The actuating element of claim 10, wherein:
the annular spring element comprises a circumference; and
the plurality of finger elements are arranged at a uniform distance from one another along the circumference.

17. The actuating element of claim 10, further comprising a plurality of annular spring elements arranged between the plurality of finger elements and the annular piston.

* * * * *